Sept. 27, 1955     W. McADAM     2,719,265
TRANSIENT-FREE CONDENSER SWITCHING ARRANGEMENTS
Filed March 8, 1950
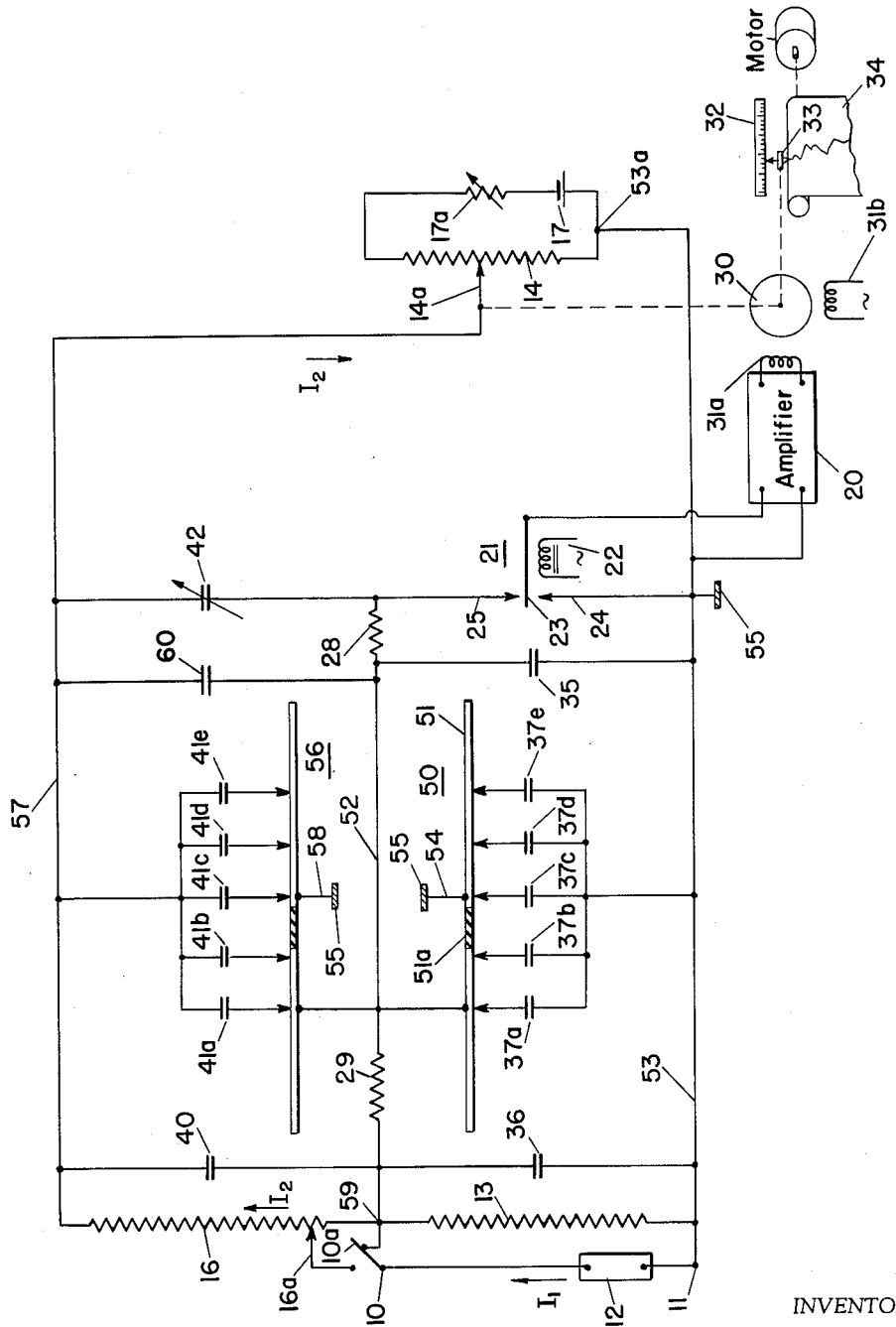
INVENTOR.
WILL McADAM
BY
Woodcock and Phelan
ATTORNEYS.

United States Patent Office 2,719,265
Patented Sept. 27, 1955

2,719,265

TRANSIENT-FREE CONDENSER SWITCHING ARRANGEMENTS

Will McAdam, Ambler, Pa., assignor to Leeds and Northrup Company, Philadelphia, Pa., a corporation of Pennsylvania Application March 8, 1950, Serial No. 148,421

11 Claims. (Cl. 324—100)

This invention relates to balanceable measuring systems suited for measurement of small currents of the type which include filter networks and damping networks having capacitors connected therein, and has for an object the provision of a circuit arrangement by means of which the capacitors may be switched into and out of the network without introduction therein of voltages due to charges collected on said capacitors when out of circuit.

In systems of the type to which the invention is particularly applicable, it is frequently necessary to change the amount of capacitance in one part or another of the measuring circuit. In the past, such capacitors have been "floating," that is, one of the leads thereto has been disconnected from the network. As a result of the lack of connection of one of its sides, the capacitor because of stray potentials has acquired a potential of indeterminate value. Accordingly, when such capacitor is connected into the circuit there is applied to the circuit the potential of the capacitor resulting in a "kick" or a sudden deflection of the balancing means forming a part of the measuring network. This is particularly objectionable where the response time of the measuring circuit is relatively long and makes for a confusing record difficult of interpretation.

In accordance with the present invention, the capacitors are so connected into the network that one or more of them may perform functions of filtering or damping, while those that are not connected to perform such functions are connected to parts of the network which will establish across the condensers a potential equal to the potential across those which are performing the desired functions in the network. Because of these provisions, the capacitance which is performing the desired functions can be increased or decreased at will without introducing deflections of the balancing means due to acquired potentials of the capacitors.

For further objects and advantages of the invention, reference is to be had to the following description taken in conjunction with the accompanying drawing in which there has been diagrammatically illustrated a typical embodiment of the invention.

Referring to the drawing, the invention in one form has been shown as applied to a measuring network having input terminals 10 and 11. The measuring network is of the type disclosed in copending application Serial No. 716,973, filed December 18, 1946, by Albert J. Williams, Jr., now Patent No. 2,547,105. Such measuring systems are particularly useful in connection with devices producing a current as a function of a condition to be measured. For example, photo-electric cells of the barrier-layer type are best used when the measuring circuit is arranged so that the short-circuit current of such a cell is measured, the short-circuit current varying closely in accord with the condition under measurement.

As shown in the drawing, a barrier-layer cell 12 is connected between terminals 10 and 11, across which terminals is also connected a circuit mesh including resistors 28 and 29, detector input terminals 24 and 25 and resistor 13. Also connected between terminals 10 and 11 is a second mesh including calibrated resistor 16 and a source of variable voltage shown as slidewire 14 and its associated battery 17. The output current $I_1$ of barrier-layer cell 12 enters the above-mentioned meshes at one of the two terminals 10 and 11 and leaves by way of the other.

The voltage drop between terminals 10 and 11 caused by the flow of current $I_1$ in the connected meshes, and the effective resistance seen by cell 12 are, however, reduced to a negligible value by connection in the circuit of the variable voltage source consisting of slidewire 14 and battery 17. This variable voltage source is so adjusted, as by movement of contact 14a relative to slidewire 14, that the current $I_2$ flowing in the mesh containing resistor 16 and the variable voltage source is equal to the output current $I_1$ of the barrier-layer cell. Under this condition, and with the direction of current flow as indicated by the arrows associated with $I_1$ and $I_2$, the current flow is zero in the mesh consisting of resistors 28 and 29, detector input terminals 24 and 25, conductor 53 and resistor 13. There exists, therefore, no voltage drop across resistor 13. The barrier-layer cell will then have across its terminals no voltage drop, and will be looking into what appears to it to be a short-circuit. The current $I_1$ then will be the short-circuit output current of the cell. Further, under this condition, the voltage developed by the variable voltage source between point 53a and contact 14a must be equal and opposite to the voltage drop across resistor 16 caused by current $I_2$ therein. As 16 is a calibrated resistor, the magnitude of current $I_2$, hence that of $I_1$, is known by the voltage drop across resistor 16 and by the equal voltage of the adjustable voltage source between point 53a and contact 14a, this latter voltage being a true measure of the short-circuit current output of the barrier-layer cell and a true measure of the radiation received by it.

The variable voltage source may be of the type having a slidewire 14 traversed by a current of constant magnitude as shown in the drawing, or any equivalent thereof. A resistor 17a is provided to adjust the current in slidewire 14, in the event of change in battery voltage. The magnitude of the calibrated resistor 16 serves to determine the range of current $I_1$ measurable by the available voltage range of the variable voltage source adjusted by movement of its contact 14a, or by movement of slidewire 14 relative to its contact 14a.

In effecting a measurement of current $I_1$, the voltage of the variable voltage source is so adjusted by contact 14a that substantially zero voltage drop exists across resistor 13. The source of unknown current is therefore looking at what appears to it to be a short-circuit between input terminal 10 and input terminal 11. This condition is detected by a suitable null-type of detector which may be a sensitive galvanometer including a mechanical relay of the type shown in Squibb Patent 1,935,732, or it may be of the electronic type as disclosed in the Williams Patents 2,113,164 and 2,367,746 and shown in diagrammatic form in the drawing. In brief, the detector comprises a thermionic amplifier 20 with whose input is associated a synchronous vibrator 21 including a driving coil 22 energized from a suitable source of alternating current and having a movable contact 23 vibrated by the coil alternately to engage fixed contacts 24 and 25. The contacts 24 and 25 are respectively connected to opposite terminals of the resistor 13, as by way of conductor 53 and by way of resistors 28 and 29. Vibration of contact 23 produces in the input circuit of the amplifier 20 an alternating signal voltage whose magnitude is a direct function of the voltage drop across the resistor 13. However, at balance the signal output of the amplifier is essentially zero because there is then no resultant drop of potential across resistor 13 with resulting zero input to the amplifier 20.

The detector forms a part of the system which effects automatic rebalancing adjustment of the slidewire 14 to bring the current $I_2$ to a value equal to the current $I_1$. To that end there is utilized an induction motor 30, one of whose windings 31a is included in the output circuit of the amplifier 20, and the other of whose windings 31b is energized from the same alternating current source as that supplying the vibrator coil 22. Accordingly, when the current $I_2$ is less or greater than the current from the barrier-layer cell 12, the winding 31a of the motor is energized, the phase-relation between its current and that of the continuously energized winding 31b depending upon the direction or sense of unbalance of the currents $I_1$ and $I_2$. Whenever the currents $I_1$ and $I_2$ are not in balance, the motor 30 therefore rotates in proper direction to adjust the current $I_2$ in sense to bring the voltage drop across the resistor 13 to zero value. At balance, or null-signal input to the detector, the position of the adjustable slidewire contact 14a with respect to slidewire 14 is a direct measure of the current $I_1$ and a scale calibrated in terms of any condition varying as a direct function of current $I_1$ may be associated therewith. As shown, the motor 30 adjusts an indicator-pen assembly 33 relative to the scale 32 and chart 34 to indicate and to record the variation of current $I_1$ which, in turn, varies as a function of the intensity of radiation received by the barrier-layer cell 12.

Interposed between the detector and vibrator 21 and the resistor 13 is a filtering or averaging network of one or more sections including resistors 28 and 29 and capacitors 35, 36, 37a, 37b, 40, 41a, 41b, 60 and 42. The filter sections may be made up of combinations of resistance and capacitance, or of resistance, capacitance and inductance, the R-C sections being shown for simplicity. While all of the elements are effective to exclude from the detector rapid variations of the input signal applied to resistor 13, the effect or tendency due to capacitors 36, 35, 37a, and 37b is adverse to desired damping action in that the presence of these capacitors tends to cause the system to overshoot the balance point. The capacitors 40, 41a, 41b, 60 and 42, while also contributing to the filtering action, tend to cause desirable damping action by preventing overshoot of the balance point. A proper balance between capacitors 36, 35, 37a, 37b and capacitors 40, 41a, 41b, 60 and 42 is necessary to maintain desirable damping action while permitting of adjustment in filtering.

More particularly, upon adjustment of slidewire contact 14a relative to slidewire 14 there is applied a changing potential between conductors 53 and 57. Inasmuch as the branch of the network including capacitor 42 and resistors 28, 29 and 13, the latter serially-connected resistors being connected across the vibrator-detector 21, constitutes a differentiating circuit, there is introduced a velocity component of voltage into the detector network which acts in a direction to advance the balance point. The damping action is greater with greater speed of movement of contact 14a since the change in potential is then at a greater rate. Thus, the greater the rate of change of the potential due to adjustment of contact 14a, the greater will be the component due to the differentiating circuit and the sooner will there be attained zero input to the detector 21, though the position of final balance has not yet been reached by the contact 14a. There are also components of damping provided by the meshes of the network, including the capacitors 40, 41a, 41b, 60 and resistors 13 and 29 which are supplementary to that just described.

In contrast with the foregoing damping action, the mesh of the network, including the resistors 16 and 29 and capacitors 35, 37a, 37b, the capacitors being connected across the vibrator-detector 21 through resistor 28, represents an integrating circuit which acts oppositely to the damping circuit previously described. Similarly, the branch including the resistor 16 and capacitor 36, also forms integrating circuits which act oppositely to the damping circuit previously described. Accordingly, in order that there shall be proper damping of the motor 30 to prevent oscillation or overshooting or undershooting of the balance point by the contact 14a, it is desired to provide a damping action which is greater than the integrating action referred to and this is readily done by proper selection of the circuit components. While the switches 50 and 56 may be ganged, that arrangement is unnecessary since dials provided thereon can include notations for the proper setting of one switch relative to the other.

In a typical embodiment of the invention, capacitor 42 had a capacitance of about 0.25 microfarad, the resistors 28, 29 had resistances of 50,000 ohms each, resistor 13 a resistance of about 20,000 ohms, whereas capacitors 41a to 41e were respectively 2, 2, 4, 8 and 16 microfarads. The capacitor 40 had a capacitance of about 0.3 microfarad. In contrast, the capacitors 35 and 36 were 1 and 2 microfarads respectively and capacitors 37a to 37e were 8, 8, 16, 32 and 64 microfarads respectively, with the resistor 16 having a resistance of 80,000 ohms.

With the foregoing circuit parameters which are to be taken as illustrative only and not as limitative, the switch 50 may be operated to include the capacitors 37c—37e to provide additional filtering, narrowing the band-pass. To provide adequate damping the switch 56 must at the same time be operated to include the remaining capacitors 41c—41e. In general, the capacity included by the switch 50 must not exceed four times the capacity included by the switch 56 in order to secure proper damping action with any desired degree of filtering. For variation in the circuit parameters, the R-C time constants of the circuits with the above values can be referred to as a guide as to the wide variations in values contemplated by the present invention.

To maintain stabilized balancing operations, arrangements are provided for simultaneous change of the capacitance in both networks. A change in capacitance in filtering will, of course, change the band-pass characteristics of the system. The switch 50 of any suitable type, such as the wafer-disc type well known to those skilled in the art has been illustrated diagrammatically with the conductive element 51 shown as including an insulating section 51a. With the switch in the position shown in the drawing the capacitors 37a and 37b are connected between conductor 52 and conductor 53. The remaining capacitors 37c, 37d and 37e are excluded from the network. However, they are connected by contact 54 to the chassis 55 of the amplifier. The chassis of the amplifier is also connected to the conductor 53. Thus, it will be seen that capacitors 37c, 37d and 37e are not floating but are always connected across to two points of the network having the same potential. At balance, it is to be remembered that there will be zero voltage drop across the resistor 13. Therefore, conductor 52 will be at zero potential. Since capacitors 37a and 37b are connected between conductors 52 and 53, when balance is reached there will be zero voltage applied to them. In other words, the voltage of or potential difference across capacitors 37a and 37b will then be equal to zero and also equal to the zero voltage across capacitors 37c, 37d and 37e. Under such circumstances, the switch 50 can be operated to include or to exclude capacitors from the measuring network without introducing any voltage or signal into the network.

Further in accordance with the invention a similar switching arrangement is provided for the capacitors 41a, 41b, 41c, 41d and 41e, a switch 56 of the same construction as switch 50 being provided for that purpose. As shown, the switch is in position connecting capacitors 41a and 41b between conductors 52 and 57. The capacitors 41c, 41d and 41e which are excluded from the network are connected to the conductor 57 leading to one side of resistor 16 and by contact 58 to the chassis 55. At balance, since there is no drop of potential across the resistor 13, the point 59 and conductor 52 are at the same potential as the line 53 leading to chassis 55. Accordingly, the conductor 52 is at the same potential as the point 59 and is at the same potential as the chassis 55 to which the capacitors 41c, 41d and 41e are conductively connected. However, there is a voltage maintained across capacitors 41a and 41b since they are connected directly across resistor 16 through which passes the current $I_2$. By reason of the foregoing circuit connections the same voltage is applied to capacitors 41c, 41d and 41e with the system at the balance point, since all of capacitors 41a—41e are connected to conductor 57. Accordingly, when the system is balanced the switch 56 may be operated to insert one or more of capacitors 41c, 41d or 41e or to exclude capacitor 41b or both capacitors 41a or to exclude 41b from the measuring network. As in the previous case, the switching will not introduce any signals or voltages into the measuring network and there will not be a resultant "kick" or abnormal sudden movement of the pen and index 33 relative to the scale 32 and the chart 34 to place an unwanted jog in the record.

While the invention has been illustrated as applicable to barrier-layer cells, it is to be understood it can be utilized in other measuring circuits where it is desired to have zero or substantially zero resistance as viewed from the condition-responsive device. The system also lends itself to adjustment for different ranges of operation. For example, if switch 10a be operated to its left-hand position, the connection from point 10 to point 59 will be shifted to the movable contact 16a of resistor 16. It will be remembered that resistor 16 is a calibrated resistor which serves to determine the range of current $I_1$ measureable by the available voltage range of the voltage source including slidewire 14. Accordingly, by shifting the contact 16a relative to calibrated resistor 16, there will be adjustment of the range of currents measureable by slidewire 14. As contact 16a is moved upwardly the current range is increased, thus the system has a high degree of flexibility which adapts it to a wide variety of current measuring applications.

In accordance with a further aspect of the present invention the response time of the system, that is the time required for response of the index 33 and of the slidewire contact 14a to a given input signal from the cell 12, may be varied over wide limits by changing in proper relation the parts of capacitances 41a—41e and 37a—37e effective in the network, the system being stable both before and after the change, and the change in response time being made without need for change in magnitude of any of the other components in the system. This aspect of the invention is particularly useful in connection with measurements of the type used in polarographic analyses. Where, in such analyses, a measurement of current flow through a dropping mercury type of cell is desired, it is to be understood that when the mercury drop grows in size the current will increase to a maximum value and as the drop falls from the electrode, the current will decrease to a lower value. Such an operation is discussed at length in Cherry Patent No. 2,267,551, and reference thereto may be made for a further description of the operation of such a system. It is sufficient here to say that the drops fall rather rapidly, and each time a drop detaches itself from the capillary tube there is a momentary substantial change of current not due to a change in the applied voltage and not due to the constituent in solution in the cell. Accordingly, it is desirable that a filtering arrangement be introduced within the network and that the time constant of the filtering network be readily adjustable to take care of different rates at which the drops of mercury may be made to leave the capillary tube. Adjustment of the time constant of the filtering network may be used also in the presence of variations of any input signal where a slower or faster movement of the contact 14a in response to such variations is desired.

Heretofore the difficulty has been that when the time constant of the filtering network has been changed, it has been necessary also to change the magnitude of some other component of the system, as for example, the setting of the gain control of the amplifier. The reason for this is that the branch of the network including capacitors 40, 41a—41e, 60, and 42, and the branch including capacitors 36, 37a—37e, and 35 are opposed in their effects on the system when contact 14a is in motion, the former tending to introduce damping and the latter acting oppositely. Variation of the portion of one of these oppositely-acting branches included in the system without corresponding variation with respect to the other produces instability of the system which requires for correction either proper change with respect to the second-named oppositely-acting branch, or change in some other part of the system. Past practice has been to vary the effective part of only one of the two oppositely-acting branches to change the response time of the system, and to change amplifier gain when instabilities have been encountered.

Further in accordance with the present invention, it has been found that if the two switches 50 and 56 be ganged, or mechanically connected together for simultaneous operation, there can be maintained a predetermined ratio between the capacitance in the effective parts of the above-mentioned oppositely-acting branches of the network. Thus, if the connected capacitances of the upper and lower branches are set to produce the desired damping and a desired time constant of filtering for input signals, thereafter the time constant for filtering of input signals can be varied as desired while maintaining the requisite damping for the motor without need to adjust the gain of the amplifier. The importance of this aspect of the invention will be readily understood by those familiar with polarographic analysis, since it is desirable to run comparative tests on the materials in the cells, and thus with such comparative tests the sensitivity or gain or the amplifier should be maintained constant even though the time constant of the filtering network be changed by substantial amounts.

The particular ratio to be maintained between the capacitances in the two branches of the network will depend upon the value selected for the resistors 13 and 16, to a lesser degree upon the resistors 28 and 29, and also upon the input impedance of the detector-amplifier and the resistance of the source of current. Thus, for a given embodiment of the invention, the ratio will be selected with reference to the non-capacitive elements of the filtering network, it having been already stated that the resistor elements forming such non-capacitive elements are desirable but not essential. Those skilled in the art will readily understand how to provide the proper values for damping initially, the capacitor 42 being variable as indicated on the drawing for that purpose. Thereafter the operation of the ganged switches 50 and 56 will maintain the desired predetermined ratio for further setting to change the time constant of the filtering network for input signals. In the typical example of one embodiment of the invention illustrated in the drawing, it will be recalled that the ratio was of the order of 4 to 1. As a rough approximation of the ratio to be maintained, reference may be had to the direct current resistance between conductors 52 and 57 compared with the direct current resistance between conductors 52 and 53. The foregoing capacitance ratio corresponds inversely with the foregoing approximation since the resistance between conductors 52 and 57 was approximately four times the direct current resistance between conductors 52 and 53.

In the general case the capacitor 60 should have the same value with respect to capacitor 35 as a selected one of capacitors 41a—41e has to a corresponding one of capacitors 37a—37e.

From the foregoing it will be seen that the invention involves a method applicable to a measuring system having an index or indicator movable relative to a scale in response to an input signal, the magnitude of which is to be measured. The system includes the two interconnected filtering networks each including capacitance. While the two networks act cumulatively in their effect upon movement of the index or indicator with respect to signals applied at the input terminals, they act oppositely as regards the introduction into the system of damping voltages, one in a direction to produce damping and the other opposing damping. The method comprises varying the time response of the system to input signals, that is, the time response of the two filtering networks with input signals applied thereto while maintaining the system stable against effects due to the opposite action of the networks as regards the introduction of a voltage upon adjustment of the slidewire. This is done by varying the capacitance in each of the two networks in the same direction while maintaining the same ratio of capacitance in those two networks.

While a preferred embodiment of the invention has been disclosed, it is to be understood that modifications may be made within the scope of the appended claims.

What is claimed is:

1. In the operation of a measuring system having an indicator movable relative to a scale in response to an input signal the magnitude of which is to be measured, the system including two interconnected filtering networks each including capacitance, the two networks acting cumulatively in their effect upon movement of said indicator upon application of signals to be measured, the system including a circuit element for producing circuit balance of the measuring network, adjustment of which introduces a damping voltage into the measuring circuit, said filtering networks acting oppositely in their effect upon said indicator with respect to said damping voltage, the method of varying the time response of the system to input signals applied thereto while maintaining the system stable against effects due to said opposite action of said networks which comprises varying the capacitance in each of said networks in the same direction while maintaining the same ratio of capacitance in said networks.

2. In the operation of a measuring system having an indicator movable relative to a scale in response to an input signal the magnitude of which is to be measured, the system including two interconnected filtering networks each including capacitance and conductive impedance elements, the two networks acting cumulatively in their effect upon movement of said indicator upon application of signals to be measured, the system including a circuit element for producing circuit balance of the measuring network, adjustment of which introduces a damping voltage into the measuring circuit, said filtering networks acting oppositely in their effect upon said indicator with respect to said damping voltage, the method of varying the time response of the system to input signals applied thereto while maintaining the system stable against effects due to said opposite action of said networks which comprises varying the capacitance in each of said networks in the same direction while maintaining the ratio of capacitance in said networks approximately in inverse relation to the ratio of the direct current resistances of said networks appearing across the terminals of said capacitors.

3. In the operation of a measuring system having an indicator movable relative to a scale in response to an input signal the magnitude of which is to be measured, the system including two interconnected filtering networks each including capacitance and conductive impedance elements, the two networks acting cumulatively in their effect upon movement of said indicator upon application of signals to be measured, the system including a potential adjusting slidewire for producing circuit balance of the measuring network, adjustment of said slidewire introducing a damping voltage into the measuring circuit, said filtering networks acting oppositely in their effect upon said indicator with respect to said damping voltage, the method of varying the time response of the system to average by predetermined amounts input signals applied thereto while maintaining the system stable against effects due to said opposite action of said networks with respect to said damping voltage which comprises varying the capacitance in each of said networks in the same direction while maintaining the ratio of capacitance in said networks approximately in inverse relation to the ratio of the direct current resistance of said networks appearing across the terminals of said capacitors.

4. The combination with a measuring system including a balanceable measuring network having balancing means including a detector having input terminals, a variable voltage source, and driving means operable under the control of said detector in response to the difference between an applied signal and a signal developed in said network as applied to said input terminals of said detector for adjusting said variable voltage source in a direction to reduce said difference, of a plurality of capacitors, means including conductors and switching means having a plurality of switching positions effective in all switching positions thereof to complete circuits of said network which extend to both sides of said capacitors, said conductors at all times connecting one side of each of said capacitors to one side of said variable voltage source, said switching means in one switching position establishing at least one of said circuits which extends between at least one of said capacitors to a point in said network having a potential which at balance is the same as the potential of a first of said input terminals for modifying the response of said detector during adjustment of said variable voltage source, said circuits then completed for the remaining of said capacitors extending to a second of said input terminals to apply to said remaining capacitors the same potential as to said one capacitor when the nework is balanced but without effect by them upon detector response during adjustment of said variable voltage source, and said switching means in additional switching positions transferring connections of additional capacitors from said second to said first terminal.

5. In a measuring system including a balanceable measuring network having a detector with input terminals, a variable voltage source, and driving means operable under the control of said detector in response to the difference between an applied signal and a signal developed in said network as applied to said input terminals for adjusting said variable voltage source of said network in a direction to reduce said difference, the combination of a plurality of capacitors, means including conductors and switching means having a plurality of switching positions effective in all switching positions thereof to complete circuits of said network which extend to both sides of said capacitors, said conductors connecting one side of each of said capacitors to one side of said variable voltage source, said switching means in one switching position establishing in one of said network circuits a connection of at least one of said capacitors in circuit with said detector and extending to a point in said network having a potential which at balance is the same as the potential of one of said input terminals for modifying the response of said detector during adjustment of said variable voltage source, said switching means also then completing circuits for the remaining of said capacitors which do not include said detector and which extend to the other of said input terminals and to the other side of said variable voltage source to apply to them the same potential as to said one capacitor when the network is balanced but without effect upon the response of said detector during adjustment of said variable voltage source, said switching means in additional switching positions transferring connections of additional capacitors from one of said input terminals to the other of said input terminals.

6. In a measuring system including a balanceable measuring network having a detector with input terminals, a variable voltage source, and driving means operable under the control of said detector in response to the difference between an applied signal and a signal developed in said network as applied to said input terminals of said detector for adjusting said variable voltage source of said network in a direction to reduce said difference, the combination of a plurality of capacitors, means including conductors and switching means having a plurality of switching positions effective in all switching positions thereof to complete network circuits of said network which extend to both sides of said capacitors, said conductors connecting a first side of each of said capacitors to a first side of said variable voltage source, said switching means having contact means operable to connect the second side of each of said capacitors to the second side of said variable voltage source and operable to disconnect respectively the second sides of said capacitors from said second side of said variable voltage source and for connecting them respectively into said measuring network in circuit with said detector to modify the response of said detector during adjustment of said variable voltage source.

7. The combination with a balanceable measuring network having balancing means including a detector, means including an adjustable circuit component adjustable under the control of said detector forming an adjustable voltage source for said network to maintain it in balance, said network including a branch in circuit with said detector and also having two points with a potential difference therebetween the same as the potential difference across said branch when said network is in balance, of multiple-point switching means, a plurality of capacitors connected to said switching means, and circuit connections under the control of said switching means for connecting one or more of said capacitors across said branch for introducing a control effect into the operation of said balancing means and for simultaneously connecting the remaining capacitors across said two points of said network, operation of said switching means sequentially changing in one direction the number of capacitors respectively connected across said branch while simultaneously changing in the opposite direction and by like amount the number of capacitors connected between said two points, thereby to vary the magnitude of said control effect without introducing unbalance into said network.

8. The combination set forth in claim 7 in which the capacitors not connected across said branch of the network are short-circuited to prevent accumulation of potential, and the capacitors which are connected across said branch of said network have zero potential difference applied to them with said network balanced.

9. In combination, a balanceable measuring network having balancing means including a detector and means including an adjustable circuit component adjustable under the control of said detector forming an adjustable voltage source for said network to maintain it in balance, said network including a first resistor with connections for flow of current of unknown magnitude therethrough, a filtering circuit including a plurality of capacitors and conductive impedance elements connected across said first resistor, said network including a second resistor connected in series-circuit relation with said first resistor and with said adjustable circuit component, a second filtering circuit including a plurality of capacitors and conductive impedance elements connected across said second resistor, said detector being connected across one of said filtering circuits which besides its filtering action introduces an undesired control effect upon said balancing means, the connections of the other of said filtering circuits in said balanceable network besides its filtering action introducing a desirable control effect in the operation of said balancing means, said balanceable network having for each of said filtering circuits two points which respectively have the same potential difference therebetween as that applied to the capacitors included in said filtering circuits when said network is in balance, multiple-point switching means having contacts included in circuit with a plurality of the capacitors of each of said filtering circuits for changing the number of capacitors connected into each of said filtering circuits, said balanceable network including circuits extending respectively from contacts of said switching means for connecting the capacitors excluded from said filtering circuits to said points having potential differences therebetween the same as the potential differences applied respectively to the capacitors included in said filtering circuits.

10. In combination, a balanceable measuring network having balancing means including a detector and means including an adjustable circuit component adjustable under the control of said detector forming an adjustable voltage source for said network to maintain it in balance, said network including a first resistor with connections for flow of current of unknown magnitude therethrough, a filtering circuit including a plurality of capacitors and conductive impedance elements connected across said first resistor, said network including a second resistor connected in series-circuit relation with said first resistor and with said adjustable circuit component, a second filtering circuit including a plurality of capacitors and conductive impedance elements connected across said second resistor, said detector being connected across one of said filtering circuits which besides its filtering action introduces an undesired control effect upon said balancing means, the connections of the other of said filtering circuits in said balanceable network besides its filtering action introducing a desirable control effect in the operation of said balancing means, the resistance and capacitance of said last-named filtering circuit having a ratio relative to a like ratio of said one filtering circuit which produces a predominant control effect, said balanceable network having for each of said filtering circuits two points which respectively have the same potential difference therebetween as that applied to the capacitors included in said filtering circuits when said network is in balance, multiple-point switching means having contacts included in circuit with a plurality of the capacitors of each of said filtering circuits for changing the number of capacitors connected into each of said filtering circuits, said balanceable network including circuits extending respectively from contacts of said switching means for connecting the capacitors excluded from said filtering circuits to said points having potential differences therebetween the same as the potential differences applied respectively to the capacitors included in said filtering circuits, said capacitors of each of said filtering circuits having capacitances which upon operation of said switching means through its several positions change in the same direction the capacitance in each of said filtering circuits and maintain the ratio of the capacitances of said filtering circuits approximately in inverse relation to the ratio of the direct-current resistances of said filtering circuits as appearing respectively across the terminals of the capacitors included in said respective filtering circuits to maintain said desired control effect predominant over said undesired control effect.

11. In combination, a balanceable measuring network having balancing means including a detector and means including an adjustable circuit component adjustable under the control of said detector forming an adjustable voltage source for said network to maintain it in balance, said network including a first resistor with connections for flow of current of unknown magnitude therethrough, a filtering circuit including a plurality of capacitors and conductive impedance elements connected across said first resistor, said network including a second resistor connected in series-circuit relation with said first resistor and with said adjustable circuit component, a second filtering circuit including a plurality of capacitors and conductive impedance elements connected across said second resistor, said detector being connected across one of said filtering circuits which besides its filtering action introduces an undesired control effect upon said balancing means, the connections of the other of said filtering circuits in said balanceable network besides its filtering action introducing a desirable control effect in the operation of said balancing means, the resistance and capacitance of said last-named filtering circuit having a ratio relative to a like ratio of said one filtering circuit which produces a predominant desired control effect, multiple-point switching means having contacts included in circuit with a plurality of the capacitors of each of said filtering circuits for changing the number of capacitors connected into each of said filtering circuits, said capacitors of each of said filtering circuits having capacitances which upon operation of said switching means through its several positions change in the same direction the capacitance in each of said filtering circuits and maintain the ratio of the capacitances of said filtering circuits approximately in inverse relation to the ratio of the direct-current resistances of said filtering circuits as appearing respectively across the terminals of the capacitors included in said respective filtering circuits to maintain said desired control effect predominant over said undesired control effect.

References Cited in the file of this patent

UNITED STATES PATENTS

| | | |
|---|---|---|
| 2,228,883 | Morgan | Jan. 14, 1941 |
| 2,404,342 | Harrison | July 16, 1946 |
| 2,447,321 | Ertzman | Aug. 17, 1948 |
| 2,453,053 | Wannamaker, Jr. | Nov. 2, 1948 |
| 2,511,868 | Newsom | June 20, 1950 |
| 2,536,501 | Hood et al. | Jan. 2, 1951 |
| 2,539,352 | Hewlett | Jan. 23, 1951 |
| 2,547,105 | Williams, Jr. | Apr. 3, 1951 |